United States Patent Office 3,356,773
Patented Dec. 5, 1967

3,356,773
PROCESS FOR PREPARING PHOSPHINATES
William E. Bacon, Kent, and Norman A. Meinhardt, Cleveland, Ohio, assignors to The Lubrizol Corporation, Wickliffe, Ohio, a corporation of Ohio
No Drawing. Filed Jan. 28, 1964, Ser. No. 340,810
13 Claims. (Cl. 260—978)

The present invention relates to a novel method of synthesis of certain phosphorus-containing organic compositions in which at least two carbon atoms are directly attached to phosphorus, and in particular to a method of preparing these organo-phosphorus compositions from metal halide complexes of a phosphorus-containing reactant.

Compounds which contain phosphorus within their molecular structure are, in general, quite useful as lubricating oil additives. Such compounds, when added in small proportions to a lubricating oil, impart extreme pressure properties to such lubricating oil. Consequently, these compounds have been used extensively throughout the broad field of lubrication. Organo-phosphorus compositions are also useful as additives in hydrocarbon fuels, asphalts, plastics, and paints. The phosphorus-containing compositions obtained by the process of this invention may be prepared by conventional methods, but in low yields and under more severe reaction conditions.

Accordingly, it is an object of this invention to provide an efficient and low cost method of preparing organo-phosphorus compounds.

Another object is to provide a process for the preparation of phosphorus compounds under mild conditions.

Still another object is to provide a process for the preparation of organo-phosphorus esters, amides, and amine salts.

These and other objects of the invention are achieved by a process for preparing phosphorus compositions comprising reacting at a temperature within the range from about 50° C. to about 200° C.

(a) A phosphorus compound having the formula

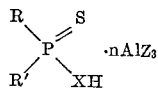

wherein X is selected from the class consisting of oxygen and sulfur; $n$ is a number from 1 to 2; Z is a halogen; and R and R' are hydrocarbon radicals, with (b) a reactive hydrogen-containing compound selected from the class consisting of amines, alcohols, mercaptans, phenols, and thiophenols.

The hydrocarbon radicals R and R' of the phosphorus reactant are radicals containing preferably from one to thirty carbon atoms. These radicals may also contain polar groups provided, however, that the polar groups are not present in proportions sufficiently large to alter significantly the hydrocarbon character of this radical. Such polar groups are exemplified by the chloro, bromo, keto, ether, aldehyde, etc. groups. Additionally, the hydrocarbon radicals may be the same or different aliphatic, cycloaliphatic, and/or aromatic radicals.

Examples of the aliphatic and cycloaliphatic radicals are methyl, ethyl, propyl, isobutyl, n-hexyl, cyclohexyl, chloroethyl, nitro propyl, chloro cyclohexyl, etc.

Examples of aromatic radicals are the organic radicals containing at least one resonant ring structure such as phenyl, naphthyl, anthracyl, phenanthryl, triphenylenyl, biphenyl, and terphenyl radicals, and the substitution products of these such as alkylation products, halogenation products, nitration products, etc. Examples of the alkylation products include tolyl, cresyl, xylyl, mesityl-enyl, diethyl phenyl, isopropyl phenyl, tert-butyl phenyl, paraffin wax-substituted phenyl, dodecyl phenyl, etc. Examples of halogenation products include chlorophenyl, dichloro phenyl, bromophenyl, mono- and polychloro xenyl, mono- and polychloro naphthyl, ethyl chlorophenyl, etc. Although any of the above aromatic radicals can be utilized, organic radicals containing but one resonant ring structure are preferred.

The organic phosphorus reactants which are useful in the process of this invention include phosphinodithioic acids and phosphinomonothioic acids. The phosphinodithioic acids can be prepared by the reaction of Grignard reagents with phosphorus pentasulfide (see Organophosphorus Compounds, G. M. Kosolapoff, p. 135, John Wiley and Sons, New York, 1950). The di-aromatic phosphinodithioic acids can also be prepared by heating an aromatic compound with a phosphorus sulfide in the presence of an aluminum halide as described in U.S. Patent No. 2,797,238.

The preparation of alkyl aryl phosphinodithioic acids is accomplished by the reaction of an alkyl thionophosphine sulfide with an aromatic compound in the presence of aluminum chloride as described by Newallis et al. in Volume 27, Journal of Organic Chemistry, page 3829. For example, phenyl methyl phosphinodithioic acid is easily prepared by the reaction of methyl thionophosphine sulfide with benzene in the presence of aluminum chloride.

The organic phosphinomonothioic acids can be prepared by the controlled hydrolysis of the corresponding phosphinodithioic acids.

The aluminum halides include aluminum chloride, aluminum bromide, aluminum fluoride, and aluminum iodide, although aluminum chloride is preferred for economy and ease of handling.

The aluminum halide complex (a) can be prepared in a number of ways. Ordinarily, the di-aromatic phosphinodithioic acids are prepared by the reaction of an aromatic compound with phosphorus pentasulfide and an aluminum halide. The molar ratio of aluminum halide to phosphorus pentasulfide should not be greater than 4:1. This upper limit is predicated on the discovery that the presence of greater amounts of aluminum halide results in the further reaction of the complex with the aromatic compound and the formation of a tri-aryl phosphine sulfide. Thus, when such an excess of aluminum halide is used, reactant (a) is not isolated. If this reactant is not isolated, the unsymmetrical phosphine sulfides described hereafter cannot be produced. The reactants are mixed and heated at the reflux temperature for 8 to 10 hours. Filtration and removal of the excess aromatic hydrocarbon results in isolation of the aluminum halide complex of the phosphinodithioic acid. The aluminum halide-phosphinodithioic acid molar ratio in these complexes can vary from 1:1 to 2:1 depending on the aluminum halide-phosphorus pentasulfide ratio in the preparatory step. The aluminum halide complexes of phosphinodithioic acids prepared by other methods can be formed by addition of one to two moles of the aluminum halide per mole of phosphinodithioic acid followed by heating at 100° C. for one or two hours. Examples of aluminum halide complexes prepared in this manner are the aluminum halide complexes of the phosphinodithioic acids prepared by the Grignard procedure, and the phosphinomonothioic acids prepared by the controlled hydrolysis of the phosphinodithioic acids.

The reactive hydrogen containing compounds which are suitable for the process of this invention include amines, alcohols, mercaptans, phenols and thiophenols.

The amines which are useful as reactant (b) in the process of this invention may be primary or secondary amines preferably having from one to 50 carbon atoms. These include the aliphatic amines such as methylamine, ethylamine, n-propylamine, n-butylamine, isobutylamine, tertiary-butylamine, 6-chloro-n-hexylamine, 3-amino-n-heptane, 2-ethylhexylamine, tertiary-dodecyl primary amine, tertiary octadecyl primary amine, n-octadecylamine, diethylamine, di-n-propylamine, and di-iso-butylamine. It is not necessary to use only a single amine. It is often convenient to use a commercial mixture of alkyl amines within which the alkyl substituent contains from about 10 to about 24 carbon atoms. A typical mixture of such commercial amines, for example, consists of tertiary-alkyl primary amines containing from about 12 to about 15 carbon atoms, said mixture averaging about 12 carbon atoms per amine molecule. Polyamines are also useful, especially alkylene amines conforming for the most part to the formula

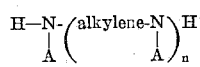

wherein $n$ is an integer preferably less than about 10, A is a hydrocarbon or hydrogen radical, and the alkylene radical is preferably a lower alkylene radical having less than about 8 carbon atoms. Examples of such polyamines are ethylene diamine, triethylene tetramine, propylene diamine, octamethylene diamine, trimethylene diamine, pentaethylene hexamine, 2-heptyl-3-(2-aminopropyl)imidazoline, and 4-methyl imidazoline. Higher homologues such as are obtained by condensing two or more of the above-illustrated alkylene amines are also useful.

Examples of aromatic amines which are suitable as reactants in the process of the invention include aniline and its substitution products such as the alkylation products, halogenation products, nitration products, etc. Examples of the alkylation products include o-toluidine, para-ethylaniline, para-isobutylaniline, para-isopropylaniline, and the mono-substituted anilines where the substituent is on the nitrogen atom such as N-methylaniline, n-ethylaniline, N-propylaniline, diphenylamine, etc. Examples of the halogenation products include chloroaniline, bromoaniline, 2,4-dibromo-6-nitroaniline, 2-chloro-4-methylaniline, etc. Examples of nitration products include para-nitroaniline, ortho-nitroaniline, N-methyl-meta-nitroaniline, etc.

The reaction of the aluminum halide complex (a) with amines at temperatures below 100° C. results in the formation of amine salts having the following general formula wherein R, R', and X are as defined above, A is either hydrogen or R'', and R'' is a hydrocarbon radical.

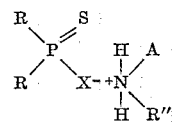

Examples of amine salts prepared in this manner include
anilinium diphenylphosphinodithioate,
anilinium di-(chlorophenyl)phosphinodithioate,
diphenylammonium diphenylphosphinodithioate,
methylphenylammonium diphenylphosphinodithioate,
diphenylphosphinomonothioate, and
para-nitroanilinium-diphenyl-phosphinomonothioate.

When the reaction of the aluminum halide complex (a) with amines is carried out at 100° C. and higher, phosphorus amides are formed having the following general formula wherein R, R', A and R'' are as defined above.

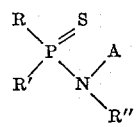

Examples of phosphorus amides prepared from the aluminum halide complex of phosphinodithioic acids include N-methyl, dichlorophenylphosphinothioic amide, N-methyl diethylphosphinothioic amide, N-(dodecylphenyl)dichlorophenylphosphinothioic amide, and N-phenyl di-n-propylphosphinothioic amide, and N-methyl phenylethylphosphinothioic amide. The aluminum halide complex of a phosphinomonothioic acid reacts with an amide to give the corresponding phosphinothioic amide.

By the process of this invention, the reactions of aluminum halide complexes of phosphorus reactants such as phosphinodithioic acids with alcohols, phenols, mercaptans, and thio phenols, proceed in the following manner wherein R''' is a hydrocarbon radical (aromatic or aliphatic) and R, R', Z and X are as defined above.

(A)

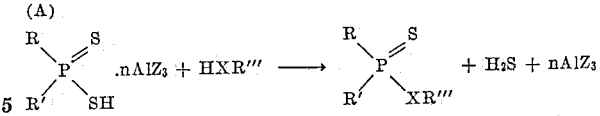

Thus, the reaction of aluminum halide complexes of phosphinodithioic acids with alcohols and phenols (where X is oxygen) produces monothioic esters while the reaction with mercaptans and thiophenols (where X is sulfur) produces dithioic esters.

The reactions of the aluminum halide complexes of phosphinomonothioic acids with alcohols and phenols produce phosphinomonothioic esters (reaction B), while reactions with mercaptans and thiophenols produce phosphinodithioic esters (reaction C).

(B)

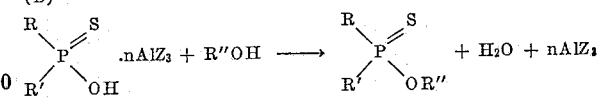

(C)

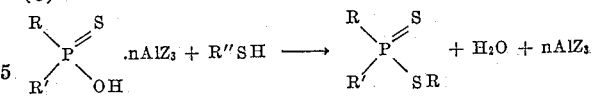

The alcohols which can be used as reactant (b) in the process of this invention include the various monohydric aliphatic, aryl aliphatic, and cycloaliphatic alcohols preferably those alcohols having from one to 30 carbon atoms. Such aliphatic, aryl aliphatic and cycloaliphatic alcohols may contain substituent groups such as, e.g., phenyl, chloro, bromo, and nitro groups. Suitable alcohols, include for example, methanol, ethanol, propanol, n-butanol, isobutanol, n-pentanol, n-heptanol, dodecanol, cyclohexanol, methyl chlorocyclohexanol, benzyl alcohol, and xylyl alcohol.

Suitable examples of the esters produced from alcohols include
methyl diphenylphosphinomonothioate,
cyclohexyl diethylphosphinomonothioate,
isobutyl di-(chlorophenyl)phosphinomonothioate,
benzyl diphenylphosphinomonothioate,
isobutyl diphenylphosphinomonothioate,
ethyl diethylphosphinomonothioate, and
isopropyl phenyl-methyl-phosphinomonothioate.

Phenols which can be used in the process of this invention include phenol, alkylated phenols, halogenated phenols, nitrated phenols, etc. Phenol and alkyl substituted phenol having from one to 20 carbon atoms in the alkyl group are especially preferred. Examples of such phenols inculde ortho-ethyl phenol, para-ethyl phenol, ortho-propyl phenol, para-butyl phenol, para-amyl phenol, para-benzyl meta-bromophenol, para-chlorophenol, 2,5-dichlorophenol, 2,6-dichloro-4-nitrophenol, and para-nitrophenol.

The phosphorus esters prepared from phenols are the phosphinomonothioates. For example, the following phosphorus esters are easily prepared:
phenyl diphenylphosphinomonothioate,
phenyl ditolylphosphinomonothioate,
phenyl diethylphosphinomonothioate,
chlorophenyl di-isobutylphosphinomonothioate,
tolyl dipropylphosphinomonothioate, phenyl di(waxphenyl)phosphinomonothioate,
nitrophenyl di-(chlorophenyl)phosphinomonothioate,
chlorophenyl di-(chlorophenyl)phosphinomonothioate, and
phenyl phenyl-methyl-phosphinomonothioate.

Examples of mercaptans which are useful for the process of this invention are those having from one to 30 carbon atoms and these include methyl mercaptan, ethyl mercaptan, 1-propyl mercaptan, 2-propyl mercaptan, n-butyl mercaptan, isobutyl mercaptan, tertiary-butyl mercaptan, n-pentyl mercaptan, n-hexyl mercaptan, n-heptyl mercaptan and dodecyl mercaptan.

Examples of the dithioate esters prepared when mercaptans are reacted with the aluminum halide complexes of (a) are isobutyl diphenylphosphinodithioate,
isobutyl dichlorophenylphosphinodithioate,
hexyl diethylphosphinodithioate, and
cyclohexyl di(para-nitrophenyl)phosphinodithioate,
heptyl phenyl-isopropyl-phosphinodithioate, and
pentyl phenyl-isopropyl-phosphinodithioate.

The reactive hydrogen containing compound (b) may also be a thiophenol or an alkyl substituted thiophenol having preferably from one to 20 carbon atoms in the alkyl substituent. Examples of such thiophenols include thiophenol, ortho-methyl thiophenol, para-ethyl thiophenol, para-nitro thiophenol, para-chlorothiophenol, para-bromo thiophenol, etc. Thus, using thiophenols as the reactive hydrogen containing compound in the process of this invention, phosphinodithioates are easily prepared. Suitable examples of these esters are phenyl diphenylphosphinodithioate,
phenyl ditolylphosphinodithioate,
phenyl diethylphosphinodithioate,
para-chlorophenyl ditolylphosphinodithioate,
para-nitrophenyl diethylphosphinodithioate,
phenyl di-(waxphenyl)phosphinodithioate, and
chlorophenyl di-(chlorophenyl)phosphinodithioate, and
phenyl phenyl-isopropylphosphinodithioate.

The temperature of the reaction of the phosphorus compound with the reactive hydrogen containing compound of (b) may be as low as 50° C., and in some cases, be as high as 200° C. Generally, the reaction is carried out at the reflux temperature of the reactive hydrogen containing reactant (b).

The time required for the reactions of this invention varies throughout a wide range, depending upon the reactivity of the reactants and the temperature of the reaction mixture. Generally, a reaction time of from about one to 15 hours is sufficient but in some instances it may be desirable to heat the reaction mixture for 20 hours or more to insure completion of the reaction. Those reactions which are substantially complete within a short period of time are not adversely affected if heating is continued for a longer period of time. Furthermore, the process of this invention may be carried out at superatmospheric pressures and at correspondingly higher reaction temperatures to give good yields of products in shorter periods of time than would otherwise be required.

The process of this invention is carried out by heating a mixture of the phosphorus-containing reactant (a) with component (b) as illustrated in the examples below. Stoichiometrically, the molar ratio of phosphorus-containing reagent to reactant (b) is not critical since some of the product will be obtained when any amount of the two reactants is brought into contact. However, it is generally desirable to use a slight excess of reactant (b) to insure completion of the reaction. Although the aluminum halide complex of (a) is generally formed before reactant (b) is added, it is also possible to form the complex in situ. Thus, the reaction may be brought about by mixing the phosphorus-containing reactant with reactant (b) and the aluminum halide.

Upon completion of the reaction, the reaction mixture is poured into water which may be slightly acidic. In this manner, the aluminum halide is removed and the product may be isolated free from aluminum halide either by filtration, or by extraction with a suitable solvent.

If the reaction mixtures as described above lack sufficient fluidity to allow proper mixing, it may be desirable to add additional amounts of reactant (b) as a solvent. The excess amount of this reactant can then be recovered subsequently. In general, however, fluidity is not a problem.

The following examples illustrate the process of this invention.

*Example 1*

A mixture of 900 grams (11.5 moles) of benzene, 320 grams (1.44 moles) of phosphorus pentasulfide and 386 grams (2.9 moles) of aluminum chloride is heated to reflux temperature for 8 hours and then allowed to cool to room temperature. The mixture is filtered and the excess benzene removed from the filtrate by distillation. The residue in the aluminum chloride complex of diphenylphosphinodithioic acid having an aluminum chloride to acid ratio of 1 to 1.

*Example 2*

The aluminum chloride complex of di-(chlorophenyl)-phosphinodithioic acid having an aluminum chloride to acid ratio of 1.1 to 1 is prepared, according to the procedure of Example 1, by the reaction of 890 grams (4 moles) of phosphorus pentasulfide, 2500 grams (22.3 moles) of chlorobenzene and 1170 grams (8.8 moles) of aluminum chloride.

*Example 3*

To 100 grams (0.25 mole) of the aluminum chloride complex of Example 1 there is added 28.5 grams (0.32 mole) of aniline. The ensuing reaction is exothermic and the reaction mixture thickens whereupon 200 grams of benzene is added to facilitate stirring. The product is heated for 8 hours at 80°–82° C. to complete the reaction and the product is poured into water. The product which is isolated by filtration is dissolved in benzene and dried with magnesium sulfate. Evaporation of the benzene yields anilinium diphenylphosphorodithioate, which has a phosphorus content of 9.06% (theory, 9.00%), a sulfur content of 17.43% (theory, 18.60%), and a nitrogen content of 3.98% (theory, 4.07%).

*Example 4*

To 270 grams of the product of Example 1, there is added 100 grams (1.36 moles) of isobutyl alcohol at 60°–70° C. over a period of 45 minutes. The mixture is heated at 100° C. for 4 hours and the excess isobutyl alcohol is removed by heating to 140° C./10 mm. The residue is poured into ice-water and the product extracted with benzene, dried with magnesium sulfate, filtered, and the benzene removed by heating to 100° C./10–15 mm. The residue is the product having a phosphorus content of 10.3% and a sulfur content of 11.32%.

*Example 5*

To 99 grams (0.25 mole) of the aluminum chloride complex prepared in Example 1, which is heated at 75° C., there is added 47 grams (0.5 mole) of melted phenol. The mixture is heated at 100° C. for 1 hour during which time hydrogen chloride is evolved and the mixture is poured into an ice-cold 10% aqueous solution of hydrochloric acid. This product is isolated by filtration and recrystallized from naphtha (B.P. 60°–90° C.). The phenyl diphenylphosphinothioate prepared in this manner has a melting point of 112°–114° C., a phosphorus content of 9.90% (theory, 9.92%), and a sulfur content of 11.05% (theory 10.2%).

*Example 6*

To 551 grams (1.1 moles) of the product of Example 2, there is added, over a period of 1.5 hours at 70°–85°

C., 248 grams (1.3 moles) of a tertiary alkyl (a mixture of $C_{11}$ and $C_{14}$ radicals) primary amine having a molecular weight of 191. The mixture is heated at 80°–90° C. for 3 hours whereupon 200 ml. of benzene is added and the heating continued for 3 additional hours. The mixture is cooled to 50° C. and poured into ice-water with rapid stirring. The product is extracted with benzene, washed 3 times with water, dried with magnesium sulfate, filtered and heated to 190° C./1.0 mm. The residue is the product having a phosphorus content of 6.00%, a sulfur content of 11.69%, a nitrogen content of 2.20%, and a chlorine content of 15.7%.

*Example 7*

To 500 grams (1.0 mole) of the product of Example 2, there is added 287 grams (1.1 moles) of dodecyl aniline over a period of 45 minutes while maintaining the temperature of 50° C. Benzene (400 ml.) is added to reduce the viscosity of the mixture and the mixture is heated at 50°–60° C. for 4 hours, cooled and poured into ice-water. The product is washed 4 times with water, extracted with benzene, and the benzene layer filtered and dried with magnesium sulfate. The benzene is removed by distillation at 150° C./10–15 mm., and the residue is heated at 190° C. at 10–20 mm. for 7 hours to remove hydrogen sulfide. The N-(dodecylphenyl)dichlorophenylphosphinothioic amide prepared in this manner has a phosphorus content of 5.61% (theory, 5.67%), a sulfur content of 5.02% (theory, 5.87%), a nitrogen content of 2.43% (theory, 2.57%) and a chlorine content of 11.4% (theory, 12.95%).

*Example 8*

A mixture of 900 grams (11.5 moles) of benzene, 640 grams (2.88 moles) of phosphorus pentasulfide and 1540. grams (5.78 moles) of aluminum bromide is heated at reflux for 10 hours and filtered to remove the remaining solid. The excess benzene is removed from the filtrate by heating at 100° C. at 10 mm. over a period of 5 hours. The residue is the aluminum bromide complex of diphenylphosphinodithioic acid. To 402 grams (0.61 mole) of this aluminum bromide complex which is heated at 75° C., there is added 112 grams (1.2 moles) of melted phenol. The mixture is heated at 100° C. for 2 hours and is then poured into an ice-cold dilute solution of hydrochloric acid. The product is isolated by filtration.

*Example 9*

To 551 grams (1.1 moles) of the product of Example 2, there is added 143 grams (1.3 moles) of thiophenol over a period of 1.5 hours at 70°–85° C. The mixture is heated at 90°–110° C. for 3 hours and poured into an ice-cold dilute solution of hydrochloric acid. The product is isolated by filtration and recrystallized from naphtha (B.P. 60°–90° C.).

*Example 10*

A mixture of 173 grams (1.0 mole) of diethylphosphinodithioic acid, 114 grams (1.2 moles) of phenol and 600 grams (4.5 moles) aluminum chloride is heated at 120°–130° C. for 10 hours. The reaction mixture is cooled to 30° C. and poured into two liters of ice-water. The product is isolated by filtration.

*Example 11*

The procedure of Example 4 is repeated except that the aluminum chloride complex of diphenylphosphinodithioic acid is replaced by 258 grams of the aluminum chloride complex of diphenylphosphinomonothioic acid.

*Example 12*

A mixture of 450 grams (5.8 moles) of benzene, 655 grams (5.8 moles) of chlorobenzene, 320 grams (1.44 moles) of phosphorus pentasulfide and 400 grams (3 moles) of aluminum chloride is heated at reflux temperature for 8 hours and then allowed to cool to room temperature. The mixture is filtered and the excess benzene and chlorobenzene removed from the filtrate by distillation.

To 300 grams of this aluminum chloride complex (the residue above), there is added 121 grams (1.1 mole) of thiophenol and the mixture is heated to 130° C. for 4 hours while water is removed. The mixture is then poured into one liter of an ice-cold solution of hydrochloric acid and the product isolated by filtration.

*Example 13*

To 484 parts (1.0 mole) of an aluminum bromide complex of phenyl-methyl-phosphinomonothioic acid having an aluminum bromide to acid ratio of 1.1:1, there is added 71 parts (1.2 moles) of isopropyl alcohol at 60°–70° C. over a period of 1 hour. The mixture is heated at 100° C. for 4 hours and the excess isopropyl alcohol is removed by heating to 100° C./10 mm. The residue is poured into ice-water and the product extracted with benzene, dried with magnesium sulfate, and filtered. The benzene is removed by heating to 100° C./10–15 mm. and the residue is the desired product.

*Example 14*

The procedure of Example 13 is repeated except that 509 grams of the aluminum bromide complex of phenyl isopropyl phosphinodithioic acid is used in place of the aluminum chloride complex of phenyl-methyl-phosphinodithioic acid, and 158 grams (1.2 moles) of n-heptanethiol is used in place of the isopropanol.

*Example 15*

To 340 parts (1.0 mole) of an aluminum chloride complex of phenyl-isopropyl-phosphinomonothioic acid having an aluminum chloride to acid ratio of 1.1:1, there is added 115 grams (1.2 moles) of n-pentanethiol and the mixture is heated to 140° C. for 4 hours while water is removed. The mixture is then poured into 1 liter of ice-water and extracted with benzene. The benzene is removed by distillation at 100° C./10–15 mm. and the residue is the product.

The phosphorus compounds prepared by the process of this invention can be employed as improving agents in lubricating oils and greases, particularly as additives for use in improved lubricants intended for use in crankcases of internal combustion engines, jet aviation engines, steam cylinders, steam locomotives, gas engines, and hydraulic compressor, turbine, spindle, and torque converter mechanisms. Other suitable uses are in asphalt emulsions, insecticidal compositions, fire-proofing and stabilizing agents and plasticizers and plastics, paint driers, cutting oils, metal drawing compositions, flushing oils, emulsifying agents, penetrating agents, gum solvent compositions, and improving agents for hydrocarbon fuels.

A specific illustration of such utility is the application to tomato plants of an insecticidal composition comprising an aqueous emulsion of 95 parts (by weight) of water, 4 parts of kerosene, 1 part of the product of Example 5, and 0.2 parts of sodium dodecylbenzene sulfonate (emulsifier). The composition is useful as a spray and is effective to control the infestation of insects on vegetation.

What is claimed is:
1. A process for preparing phosphorus compositions comprising reacting at a temperature within the range from about 50° C. to about 200° C.
(a) a phosphorus compound having the formula

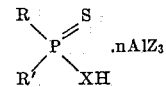

wherein X is selected from the class consisting of oxygen and sulfur; $n$ is a number from 1 to 2; Z is a halogen; and R and R' are hydrocarbon or chlorine- or bromine-substituted hydrocarbon radicals, with
(b) a reactive hydrogen-containing compound selected from the class consisting of amines, alcohols, mercaptans, phenols, and thiophenols.

2. The process of claim 1 wherein Z is chlorine.

3. The process of claim 1 wherein R and R' are aromatic radicals.

4. The process of claim 1 wherein X is oxygen.

5. A process for preparing phosphorus compositions comprising reacting at a temperature within the range from about 50° C. to about 200° C.

(a) a phosphorus compound having the formula

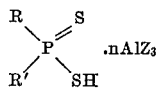

wherein $n$ is a number from 1 to 2; Z is a halogen, and R and R' are hydrocarbon or chlorine- or bromine-substituted hydrocarbon radicals, with (b) a reactive hydrogen-containing compound selected from the class consisting of amines, alcohols, mercaptans, phenols, and thiophenols.

6. The process of claim 5 wherein Z is chlorine.

7. The process of claim 5 wherein R and R' are aromatic radicals.

8. The process of claim 5 wherein R and R' are alkaryl radicals.

9. The process of claim 5 wherein R and R' are chloroaryl radicals.

10. The process of claim 5 wherein the reactive hydrogen-containing compound of (b) is an amine.

11. The process of claim 5 wherein the reactive hydrogen-containing compound of (b) is a phenol.

12. The process of preparing phenyl diphenylphosphinothioate comprising reacting at a temperature within the range from about 50° C. to about 200° C.

(a) the phosphorus compound having the formula

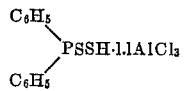

with (b) phenol in the mole ratio of 1:1.1.

13. The process of preparing N-phenyl diphenylphosphinothioic amide comprising reacting at a temperature within the range from about 50° C. to about 200° C.

(a) the phosphorus compound having the formula

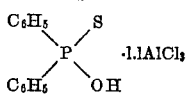

with (b) aniline in the mole ratio of 1:1.1.

References Cited

UNITED STATES PATENTS 3,041,367   6/1962   Leber et al. _____ 260—978

OTHER REFERENCES

Cram et al.: "Organic Chemistry," 2nd edition (1964), McGraw-Hill, New York, N.Y., pp. 217–8.

CHARLES B. PARKER, *Primary Examiner.*

A. H. SUTTO, *Assistant Examiner.*

UNITED STATES PATENT OFFICE

CERTIFICATE OF CORRECTION

Patent No. 3,356,773                          December 5, 1967

William E. Bacon et al.

It is certified that error appears in the above identified patent and that said Letters Patent are hereby corrected as shown below:

Column 4, line 3, "amide" read -- amine --; line 63, "inculde" should read -- include --. Column 6, line 21, "in" should read -- is --. Column 7, line 43, "phehol" should read -- phenol --.

Signed and sealed this 7th day of October 1969.

(SEAL)
Attest:

Edward M. Fletcher, Jr.
Attesting Officer

WILLIAM E. SCHUYLER, JR.
Commissioner of Patents